United States Patent Office 3,069,932
Patented Dec. 25, 1962

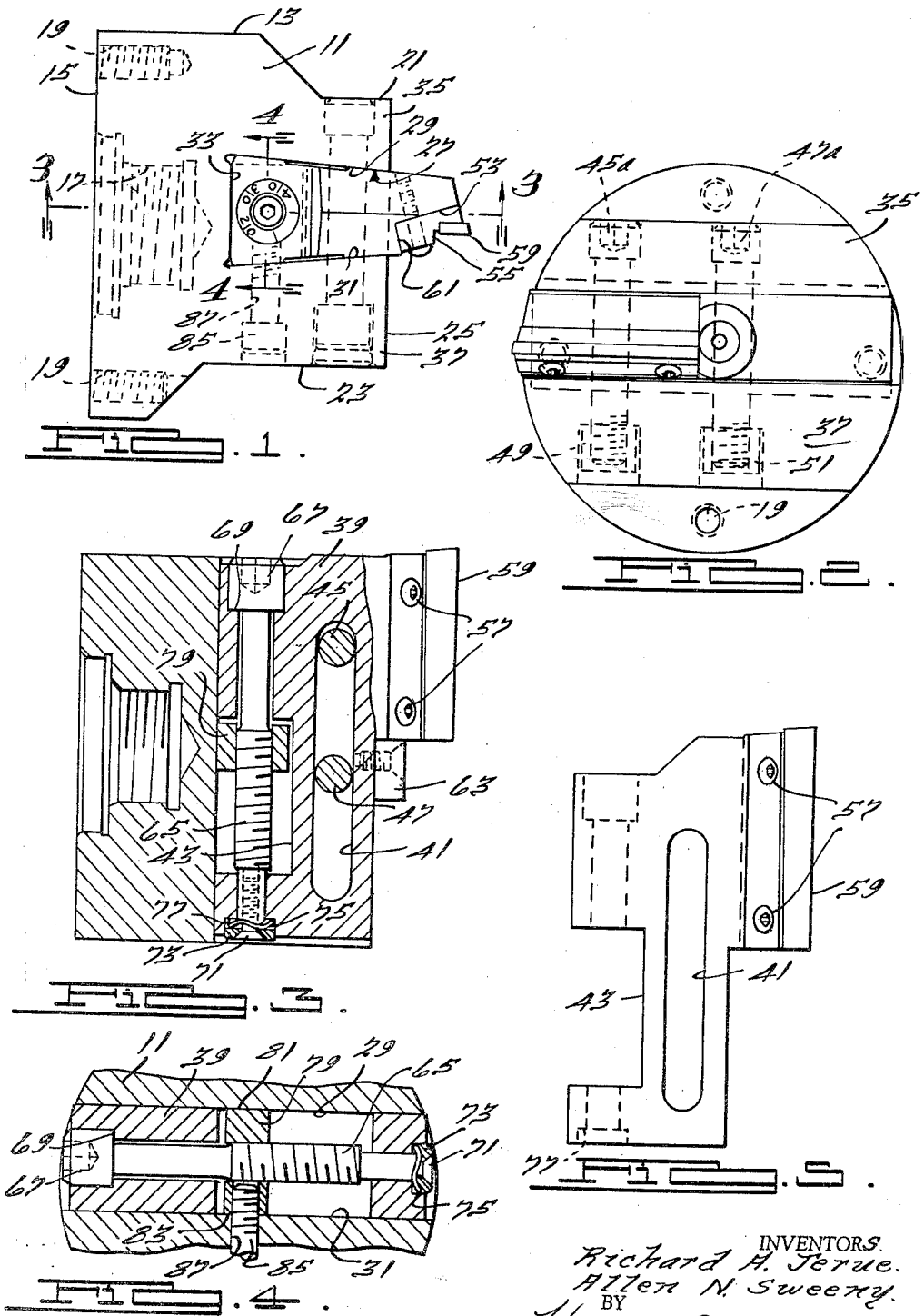

3,069,932
BLADE FACING TOOL
Allen N. Sweeny, Grosse Pointe, and Richard A. Jeruc, Birmingham, Mich., assignors to De Vlieg Machine Company, Royal Oak, Mich., a corporation of Michigan
Filed June 8, 1959, Ser. No. 818,887
3 Claims. (Cl. 77—58)

This invention relates to tools for use in boring and facing or spot facing operations and particularly to a boring head adapted to be supported and driven in rotation by a boring machine, jig borer, turret lathe, heavy drill press or other machine tool.

It is an object of the present invention to provide a rotatably driven facing tool having an elongated cutting edge for the finishing of flat surfaces such as counter bore shoulders, boss faces or the like.

It is another object of the present invention to provide a facing tool having an elongated blade which is adjustable in a radial direction to finish circular flat surfaces of varying diameters.

It is another object of the present invention to provide a tool of the above character in which the tool holder or other member supporting the cutting edge may be quickly removed from and installed in its supporting member or head.

It is another object of the present invention to provide a tool of the above character having a highly precise lead screw by which the blade may be accurately adjusted and in which the lead screw is in a position protected from dirt, chips or other foreign matter which might cause damage thereto.

Still another object of the present invention is to provide a tool of the above character in which the cutting blade and its associated supporting structure is firmly held in place and is retained in its associated head in a manner positively locked against displacement or misadjustment.

It is still another object of the present invention to provide a tool of the above character which is sturdy in construction, inexpensive of manufacture and convenient of use.

These and other objects of the present invention will become apparent from the following detailed description taken in conjunction with the accompanying drawings wherein:

FIGURE 1 is a side elevational view of a tool embodying the principles of the present invention;

FIG. 2 is a front elevational view of the structure illustrated in FIG. 1;

FIG. 3 is a sectional view of the structure illustrated in FIG. 1 taken along the line 3—3 thereof;

FIG. 4 is a sectional view of the structure illustrated in FIG. 1 taken along the line 4—4 thereof; and FIG. 5 is an elevational view of the blade holder illustrated in FIG. 3, showing the same removed from the adjacent structure.

Referring now to the drawings, FIGURE 1 illustrates a boring head or body member 11 having a cylindrical outer periphery or side wall 13 and a circular flat rear face 15. The head is provided with a bore 17 extending inwardly from the rear face 15 thereof which is suitably threaded and counter bored to provide means for attachment to a spindle or other driving member (not shown) by which the head 11 is supported and driven in rotation. In addition, threaded screw holes 19 are provided for additional fastening to the driving member. It will, of course, be appreciated that any suitable means may be provided adjacent the rear face 15 of the head by means of which the head may be supported and either driven in rotation about its longitudinal axis or held stationary while a workpiece is rotated relative thereto. The forward end of the head 11 is provided with flat opposite and parallel side walls 21 and 23, respectively, which join the front face 25 of the head on opposite sides thereof. The flat side walls 21 and 23, which may be conveniently formed by a milling operation, reduce the weight of the head and contribute to the deflectability or "springiness" of the material adjacent thereto, as will be subsequently explained. However, in small sizes of the head 11, the flat side walls 21 and 23 may be advantageously omitted and the head left smoothly cylindrical throughout its length. Formed inwardly from the front face 25 of the head and extending diametrically across the head is a dovetail groove or slot 27 having a pair of opposed side walls 29 and 31 and a rear wall 33. The side walls 29 and 31 are inclined rearwardly outwardly and divide the forward end of the head into opposite deflectable portions 35 and 37.

Slidably but snugly fitted within the dovetail groove 27 is a tool holder or blade holder 39 having an elongated radially disposed slot 41 and being provided with an elongated nut receiving recess 43 at the rear end thereof. A pair of locking bolts 45 and 47 having their heads 45a and 47a, respectively, counter sunk in the head portion 35 pass through the slot 41 and threadably engage nuts 49 and 51 fixed in the head half 37. By thus rotating the bolts 45 and 47, the opposite head portions 35 and 37 are drawn together to clamp the opposite sides of the blade holder therebetween and draw the blade holder into a fully seated position against the rear wall 33 of the groove 27. In view of the fact that the bolts 45 and 47 are located forwardly of the rear wall 33 of the groove 27, the side walls 29 and 31 are drawn into positive clamping abutment with the side of the blade holder 39 and the blade holder is securely held against the rear wall 33.

The blade holder 39 is provided with a blade seat 53 against which a blade 55 is seated and secured by means of screws 57. The blade element 55 may carry a tip portion 59 of tungsten carbide, high speed steel or other suitable cutting material. In addition to the seat 53, a shoulder 61 formed on the blade holder 39 abuts another side of the blade 55, while a stop button 63 engages the blade to absorb radially inward forces. Thus, the screws 57 are relieved of substantially all external forces and serve only to retain the blade element 55 in position.

To adjust the blade holder 39 in a radial direction, the blade holder 39 is provided with a rotatable lead screw 65 having a head 67 at one end thereof positioned within a counter bore 69 at one side of the blade holder 39 and having a screw 71 threaded tightly within its opposite end. The screw 71 carries a washer 73 which compresses a spring washer 75 against a counter bore shoulder 77 to both hold the lead screw 65 against axial movement and to provide a frictional drag, preventing inadvertent rotation of the lead screw 65. The screw 71, which is threaded tightly into the lead screw 65, rotates with the lead screw. The threaded portion of the lead screw 65 extends through the recess 43 and threadably engages a nut 79 disposed therein. The nut 79 has opposite side walls 81 and 83 adjacent to the side walls 29 and 31, respectively, of the groove 27. The side 83 of the nut is inclined parallel to the side wall 31 of the groove and is adapted to abut against it, while the opposite side 81 of the nut is parallel to the axis of the head and spaced slightly from the side wall 29 of the groove so as not to interfere with the deflection of the head portions 35 and 37 in clamping the blade holder 39. The fit of the nut 79 in the groove 27 is such that the nut is not free to turn therein. The blade holder 39, the blade element 55, the lead screw 65 and the nut 79 form a sub-assembly which may be conveniently removed and installed in a head 11 to provide blades of varying length. Upon installation of such an assembly in a head, the nut 79 is fixed in position by means of a cap screw 85 extending through a bore 87 in the head 11 and threaded into side 83 of the nut to hold the side 83 of the nut against the wall 31 of the groove. Thus, upon rotation of the lead screw 65, the nut 79 is held against movement and the lead screw 65 and blade holder 39 are adjusted in a direction radially of the tool. The magnitude of small adjustments may be readily determined by means of graduations on the head 67 of the lead screw 65. Once the desired adjustment has been made, the screws 45 and 47 are tightened and the blade holder is locked in place.

It will be observed that for any given blade 55, the minimum and maximum diameters of surfaces which may be finished are determined by the length of the tip 59 of the blade 55. It is intended that for each head 11 which is placed in use, a plurality of blade holders 39 may be supplied, each of said holders carrying blades of different sizes. While a larger size blade will permit the finishing of a large diameter surface, it will also increase the minimum diameter bore shoulder which can be finished. Thus, the interchangeable use of several blade holder assemblies affords a wide range of surface dimensions which can be finished. It should be noted that when the blade holder 39 is removed, the nut 79 will remain in precise position on the lead screw 65 and thus upon its reinstallation in the head 11, it is not necessary to again adjust the blade holder any major distance.

To remove a blade holder 39, together with its blade 55, lead screw 65 and nut 79 from the head 11 it is only necessary to unscrew and remove the locking screws 45 and 47 and unscrew the cap screw 85 from the nut 79. This frees the blade holder and its associated structure so that it will slide directly out of the dovetail slot 27. The nuts 49 and 51 remain firmly seated in their respective counter bores and upon the installation of a new blade holder 39, the locking bolts 45 and 47 may be threaded directly into them.

It will thus be seen that the present invention provides a means for locking or firmly retaining the blade holder in position within the dovetail slot provided in the head 11 with the locking screws 45 and 47 being locked in a position assuring that the blade holder 39 will be fully seated against the back wall 33 of the slot. In addition, the micrometer lead screw, by its protected position within the slot, is fully safeguarded against dirt, chips or other foreign matter which might damage the lead screw 65.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A boring and facing tool including a head having means at the rear end thereof for supporting said head for rotation about a given axis and a groove open to the forward end thereof, said groove having forwardly converging spaced flat side walls and a rear wall extending between said side walls, a tool holder disposed in said groove for sliding radial adjustment, said tool holder having opposite flat side walls conformably engageable with the side walls of said groove and a rear wall engageable with the rear wall of said groove, said tool holder having an opening therein providing communication between said groove side walls and a recess adjacent the rear wall thereof, clamping means extending through said opening and interconnecting portions of said head on opposite sides of said tool holder forwardly of said groove rear wall for drawing said head portions toward one another and forcing said tool holder rear wall against the rear wall of said groove, a lead screw rotatably supported at its opposite ends on said tool holder and extending across said recess, a nut threaded on said lead screw and relatively movable in said recess upon rotation of said lead screw, a surface on said tool holder engageable with said nut for preventing substantial rotation of said nut relative to said tool holder, and means carried by said head engageable with said nut for releasably securing said nut in a given position in said groove, said nut being slidable in said groove with said tool holder upon disengagement of said last-named means for removal from said groove with said tool holder.

2. The structure set forth in claim 1 including a spring operable to restrain rotational movement of said lead screw.

3. The structure set forth in claim 1 in which said nut has a surface flatly engageable with at least one of the walls of said groove and in which said means carried by said head engageable with said nut includes a threaded fastener operable to secure said nut against said at least one wall.

References Cited in the file of this patent

UNITED STATES PATENTS

| | | |
|---|---|---|
| 1,133,169 | Morris | Mar. 23, 1915 |
| 1,256,462 | Frey et al. | Feb. 12, 1918 |
| 2,209,867 | Wohlhaupter | July 30, 1940 |
| 2,541,054 | Haynosch | Feb. 13, 1951 |
| 2,874,597 | Bach | Feb. 24, 1959 |

FOREIGN PATENTS

| | | |
|---|---|---|
| 541,162 | Great Britain | Nov. 14, 1941 |